United States Patent [19]
Burkepile et al.

[11] 3,895,438
[45] July 22, 1975

[54] STYROFOAM CUTTING TOOL

[76] Inventors: Ivan H. Burkepile; Jimmie J. Burkepile, both of Rt. 4, Box 377-DE, Fort Smith, Ark. 72901

[22] Filed: Mar. 25, 1974

[21] Appl. No.: 454,730

[52] U.S. Cl. .................. 30/116; 30/392; 30/393
[51] Int. Cl.² ................ B23D 49/06; B23D 49/16
[58] Field of Search ........ 30/116, 115, 117, 272 A, 30/272 R, 392, 393, 394; 145/31 R, 33 R, 33 A, 33 AB, 33 D, 33 C

[56] References Cited
UNITED STATES PATENTS

| | | | |
|---|---|---|---|
| 2,206,614 | 7/1940 | O'Hern | 30/392 |
| 2,630,148 | 3/1953 | Ferguson | 30/393 |
| 2,705,980 | 4/1955 | Papworth | 30/393 |
| 3,297,856 | 1/1967 | Gershon | 30/116 |

FOREIGN PATENTS OR APPLICATIONS 1,130,742   10/1956   France .............. 30/272 R

*Primary Examiner*—Al Lawrence Smith
*Assistant Examiner*—J. T. Zatarga

[57] ABSTRACT

A cutting tool intended for use in the cutting and shaping of Styrofoam or any other type of foam material, the cutter including a handle adapted to be held in an individual's hand and containing a motor and reciprocating gear drive mechanism adapted to have one end of a cutting blade affixed thereto for reciprocal driving movement therefrom, the cutting blade projecting out of a front end of the handle and affixed to a resilient blade guard at its free end, the blade guard maintaining the cutting blade tensioned at all times and at all positions thereof.

5 Claims, 5 Drawing Figures

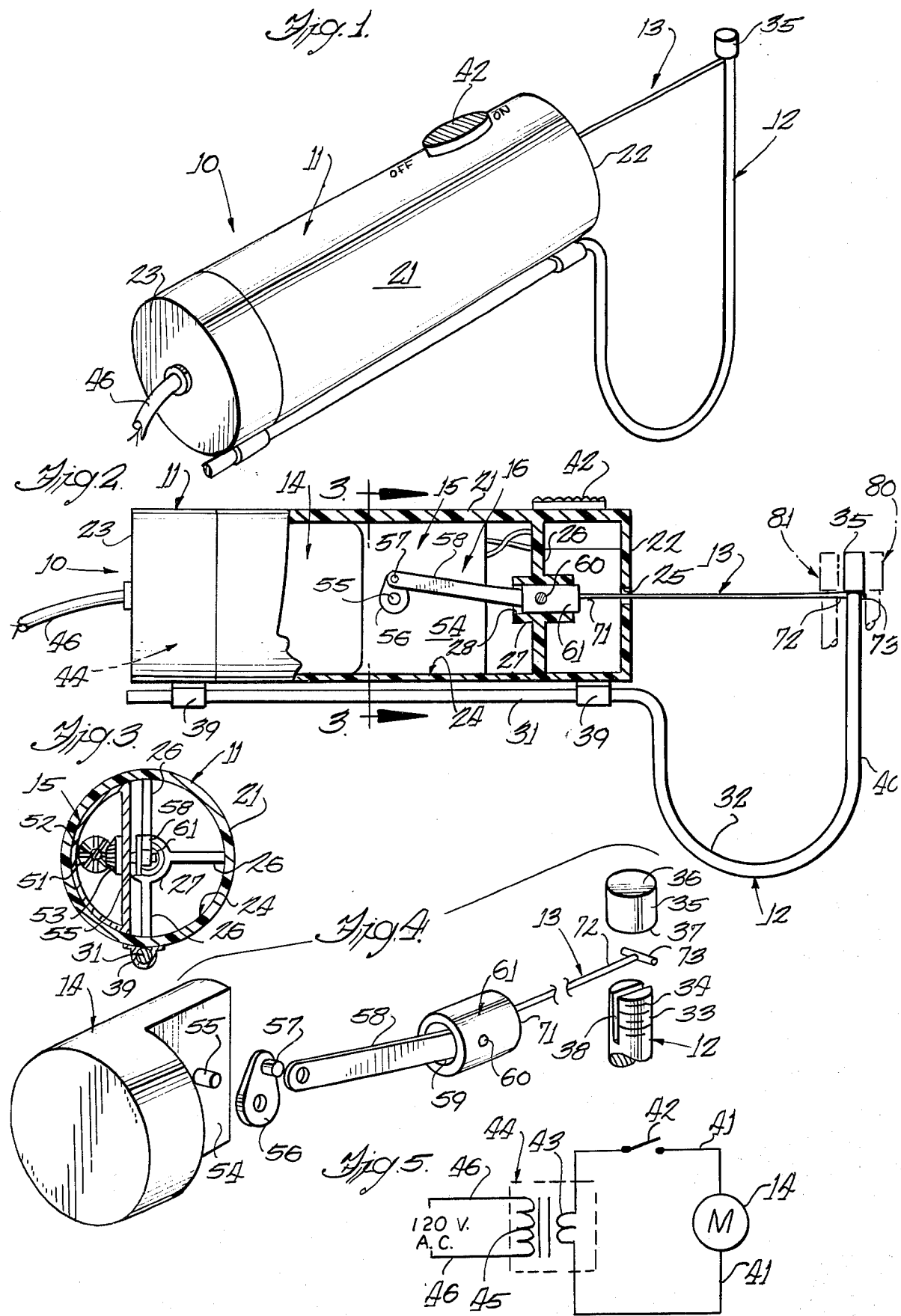

3,895,438

STYROFOAM CUTTING TOOL

BACKGROUND OF THE INVENTION

1. Field of the Invention

This invention relates generally to cutting tools and more particularly to a novel and improved hand held cutting tool intended for the cutting of Styrofoam type material in a manner to provide an even and smooth cut therethrough.

2. Description of the Prior Art

Cutting tools of various sizes, shapes and configurations for the cutting of a multiplicity of various materials are known in the prior art, but such tools do not lend themselves to the cutting of Styrofoam or other type of foam material since, because of the way such materials are formed, the cell structure of the material does not lend itself to conventional cutting processes. Accordingly, such prior art cutting tools normally provide a ripping or tearing action when attempting to cut Styrofoam as the Styrofoam tends to collapse or separate in the area in which it is being cut such that an uneven and rough cut through the Styrofoam is made.

While it is known to provide commercial size machines and tools for the cutting and forming of Styrofoam, such machines are overly complex and excessively large so as to be unsuited for general home or office use. It would thus be desirable to provide a small sized cutting tool specifically adapted for the cutting and shaping of Styrofoam in an easy and efficient manner.

SUMMARY OF THE INVENTION

The present invention recognizes the need for providing a compact and convenient Styrofoam cutting tool readily adapted for ease of use in the home, office and the like, and provides a novel Styrofoam cutting tool which remedies and overcomes all of the deficiencies and disadvantages of presently available cutting tools when used for the cutting of Styrofoam type materials.

It is a feature of the present invention to provide a Styrofoam cutting tool which is of a lightweight and durable construction and which is intended for use by being held in an individual's hand to allow for easy maneuvering and manipulation thereof during the cutting process.

A further feature of the present invention provides a Styrofoam cutting tool adapted to efficiently and rapidly cut Styrofoam in an even and smooth manner permitting the creation of an unlimited number of products and displays which use Styrofoam.

A further feature of the present invention is the provision of a Styrofoam cutting tool which is relatively simple in its construction and which therefore may be readily manufactured at a relatively low cost and by simple manufacturing methods.

Still a further feature of the present invention is the provision of a Styrofoam cutting tool which is possessed of few parts and which therefore is unlikely to get out of order, and accordingly is of a rugged and durable construction such that it may be guaranteed by the manufacturer to withstand many years of intended usage.

Yet still a further feature of the present invention is the provision of a Styrofoam cutting tool which is easy to use and reliable and efficient in operation.

Still yet a further feature of the present invention is the provision of a Styrofoam cutting tool which can be retailed at a sufficiently low price to encourage its widespread use.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the Styrofoam cutting tool of the present invention;

FIG. 2 is a side elevational view of the cutting tool with the handle partially broken away to illustrate interior details thereof;

FIG. 3 is a cross-sectional view taken along Line 3—3 of FIG. 2;

FIG. 4 is a fragmentary exploded perspective view of the drive means and cutting blade or cutting wire of the present invention; and FIG. 5 is an electrical schematic diagram of the cutting tool.

DESCRIPTION OF THE PREFERRED EMBODIMENT

Referring now to the drawings in detail there is illustrated a preferred form of a cutting tool intended for use in the cutting of Styrofoam and constructed in accordance with the principles of the present invention, the cutting tool being designated generally in its entirety by the reference numeral 10 and comprised of a handle 11 adapted to be held in an individual's hand, a blade guard 12, a cutting wire or cutting blade 13, an electric motor 14 disposed in handle 11, a gear box 15 for converting the rotary motion of the electric motor 14 to a reciprocating motion for use with the cutting wire 13, and a drive means 16 interconnecting the gear box to the cutting wire.

The handle 11 is preferably of an elongated hollow cylindrical body member 21 having a front end 22 and a back end 23 and an interior chamber 24 extending therethrough. The front end 22 has an axial opening 25 extending therethrough and adapted to freely receive cutting wire 13 therethrough as will be later described. Spaced inwardly of front end 22 is a wall 26 extending parallel to the front end and including a hollow open ended axially disposed cylindrical boss member 27 disposed centrally thereof and defining a bore 28 extending axially therethrough for use with a portion of the drive mechanism 16 as will be later described.

The blade guard 12 is formed of an elongated rod bent into a straight shank portion 31 and a generally U-shaped body portion 32, the body portion having a terminal end 33 including screw threads 34 disposed about the exterior circumference thereof and adapted to threadedly receive thereon a cylindrically shaped cap 35 having a closed top end 36 and an open bottom end 37 with interior threads adapted to threadedly engage the threads 34. A vertical slot 38 extends through terminal end 33 and is adapted to removably receive therein one end of the cutter wire 13. The shank portion 31 is secured along the bottom of handle 11 by clips 39 with the bight portion of body portion 32 extending a substantial distance below the axis of the handle 11 and with the terminal end 33 extending upwardly from the bight portion to a position above the longitudinal axis of the handle.

The electric motor 14 is preferably of the low voltage type, such as a six volt or twelve volt alternating current motor and is received in the interior 24 of handle 11 near the back end thereof, the motor being connected by suitably insulated electrical wires 41 to a push button on-off control switch 42 which is connected in series with a low voltage winding 43 of a conventional type of battery eliminator 44 having a high voltage coil 45 connected by suitable insulated electrical wires 46 projecting out of handle back wall 23 and adapted to be connected to a suitable source of electrical power such as provided by a conventional household outlet of 120 volt alternating current. In essence, the battery eliminator 44 is a step-down transformer preferably located in handle interior 24 intermediate the motor 14 and handle back end wall 23.

Disposed in handle interior compartment 24 forwardly of motor 14 is gear housing 15 having a first bevel gear 51 affixed to the output shaft 52 of motor 14, this bevel gear being in meshing engagement with a second bevel gear 53 disposed with its axis at substantially ninety degrees to the first bevel gear and extending through side wall 54 of gear housing 15 by a shaft 55 to be connected to an eccentric lever 56. The outermost end of eccentric lever 56 is provided with a pivot pin 57 projecting outwardly normal thereto and pivotally affixing thereto one end of an elongated flat rectangularly shaped link 58 having its opposite end 59 pivotally connected by a pivot pin 60 to a cylindrical chuck member 61 mounted for axial reciprocal movement in bore 28. In this manner the rotary movement of the shaft of motor 14 is converted through bevel gears 51 and 53, eccentric lever 56, link 58 and chuck 61 to reciprocal movement for driving cutting wire 13.

The cutting wire 13 may have a smooth or roughened exterior extending completely therealong and is of a small diameter or cross-section having one end 71 adapted to be inserted through handle front end wall 22 opening 25 and engage in chuck 61, the opposite end 72 provided with a transversely extending cross terminal member 73 with the end 72 adapted to be received in slot 38 of terminal end 33 with cross member 73 engaging an exterior portion of guard terminal end 33.

In operation, movement of switch 42 energizes motor 14 to effect the reciprocal drive of cutting wire 13, the cutting wire being maintained in a constantly tensioned position between chuck 61 and terminal end 33 of guard 12 by the resilient nature of terminal end leg portion 40 of the guard which permits movement of the blade between its maximum projected length relative to handle front end 22, such as designated in phantom line configuration 80, and also permits movement of the blade into its maximum withdrawn position relative to handle front end 22, this being as designated in phantom configuration by reference numeral 81. This reciprocating movement is at a high speed providing the desired cutting action providing for a smooth even cut through Styrofoam material rather than a ripping or tearing type cut as experienced by presently available cutting tools. Further, the depth of the bight of body member portion 32 of guard 12 permits for a wide variety of cuts due to the ease of maneuverability and depth of cut of the tool 10.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A cutting tool intended for use in the cutting of Styrofoam-type materials, and the like, the tool comprising:

a handle member having a hollow compartment defined interiorly thereof;

a cutting means;

a blade guard member adapted to be affixed to the handle and to project a position forwardly thereof, the portion of said blade guard projecting forwardly of said handle being resiliently movable in a direction toward and away from said handle, said blade guard being formed of a unitary rod-like member bent to the desired configuration and having a straight shank portion adapted to be affixed to said handle and to extend parallel to the longitudinal axis of said handle, said shank portion terminating in one leg of a U-shaped body portion including a bight portion extending a substantial distance downwardly from the longitudinal axis of said handle, said body portion terminating in a resilient leg portion disposed normal to the longitudinal axis of said handle and projecting upwardly from said bight portion through said longitudinal axis of said handle and terminating at a position disposed on the opposite side of said longitudinal axis from said bight portion, said terminal end having a longitudinally extending slot extending partially therethrough, screw threads disposed about the circumference of said terminal end portion over the length of said slot, said guard being further characterized by an interiorly threaded cylindrically configured cap member adapted to be threadably received on said terminal end over the length of said slot, said slot being of a width adapted to receive one end of said cutting means therein with said cap being threaded onto said terminal end in a manner to assist in securing said end of said cutting means thereto;

low voltage electric motor means disposed in said handle;

transformer means disposed in said handle compartment and adapted to be connected to a conventional source of alternating current power, said transformer having an output end providing a low voltage output connected to said motor;

switch means interposed in electrical series relationship between said transformer and said motor for selectively energizing and de-energizing said motor;

a chuck disposed in said handle compartment adjacent a forward end thereof and mounted for axial longitudinal reciprocal movement; and, drive means interconnecting said chuck to said motor for converting rotational movement of said motor into reciprocating translational motion for said chuck;

said cutting means having one end affixed to said chuck with the opposite end affixed to the terminal end of said blade guard whereby reciprocal translational motion of said chuck will effect simultaneous reciprocating movement of said cutting means.

2. The cutting tool as set forth in claim 1 wherein said handle is characterized by an elongated cylindrically configured body member having cylindrical side walls, a closed back end, and a closed front end, and an interior compartment extending longitudinally therethrough, said front end having an opening extending axially therethrough, a support wall spaced inwardly of said front end disposed in said compartment and extending substantially parallel to said front end, a hollow cylindrical boss member supported by said support member in longitudinal axial alignment with said front end opening and having an axially disposed bore extending therethrough.

3. The cutting tool as set forth in claim 2 wherein said chuck is of an elongated cylindrical configuration adapted to be received in said cylindrical bore for guided longitudinally disposed axially reciprocal movement therethrough, said chuck having a back end and a front end, said front end adapted to receive one end of said cutting means therein to transmit movement thereto.

4. The cutting tool as set forth in claim 3 wherein said drive means comprises a first bevel gear affixed to the shaft of said motor, a second bevel gear in meshed engagement with said first bevel gear and disposed at a ninety degree angle to said motor shaft, means rotatably supporting said second bevel gear, an eccentric lever affixed to a shaft extending axially from said second bevel gear for rotation of said eccentric lever thereabout, an eccentric lip of said eccentric lever having a pivot pin extending outwardly normal thereto, an elongated linkage member having one end pivotally affixed to said pivot pin and having an opposite end affixed to said back end portion of said chuck whereby rotation of said motor effects said reciprocal movement of said chuck in said cylindrical bore.

5. The cutting tool as set forth in claim 4 wherein said cutting means is characterized by an elongated cutter wire having a first end and a second end, said first end adapted to be received in said chuck, said second end having a transversely extending cross-member affixed thereto and extending outwardly of the longitudinal axis of said cutter wire, said second end adapted to be received in said slot of said terminal end of said guard member with said cross member engaging said guard member at a side opposite that from said handle.

* * * * *